E. D. PUTT.
MACHINE FOR TRIMMING TIRES.
APPLICATION FILED FEB. 27, 1917.

1,263,286.

Patented Apr. 16, 1918.
3 SHEETS—SHEET 2.

Witness:
Fred C. Davison

Inventor
Edward D. Putt
By Wilkinson + Huxley
Attys.

E. D PUTT.
MACHINE FOR TRIMMING TIRES.
APPLICATION FILED FEB. 27, 1917.
1,263,286.
Patented Apr. 16, 1918.
3 SHEETS—SHEET 3.
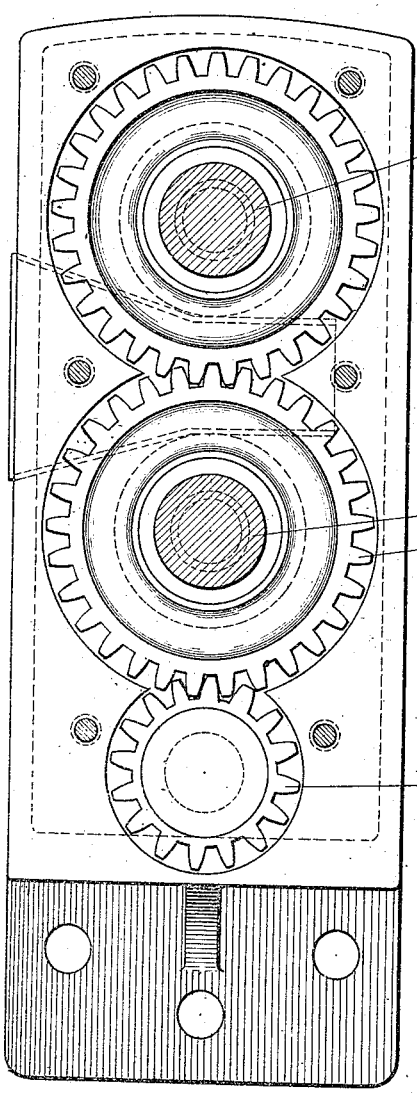
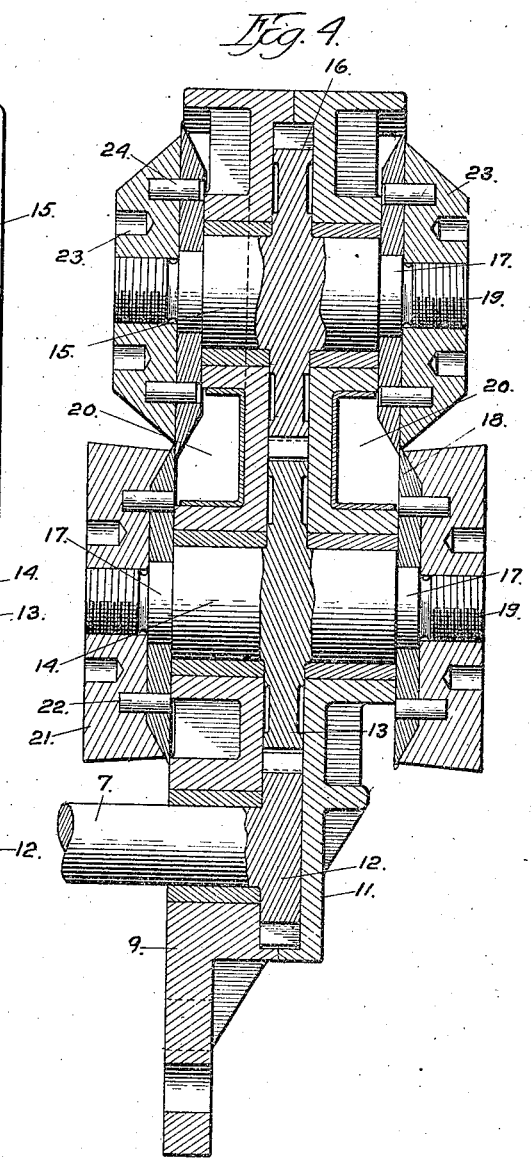

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

MACHINE FOR TRIMMING TIRES.

1,263,286.   Specification of Letters Patent.   Patented Apr. 16, 1918.

Application filed February 27, 1917. Serial No. 151,335.

*To all whom it may concern:*

Be it known that I, EDWARD D. PUTT, a citizen of the United States, residing at Akron, in the county of Summit, State of Ohio, have invented certain new and useful Improvements in Machines for Trimming Tires, of which the following is a specification.

This invention has for its purpose the construction of a machine for trimming the lower inside edges of tire casings in the final inspection or finishing of the tire. During the manufacture and molding of a tire there occurs a fin or ragged edge at the base or point of the bead, the trimming of which is one of the last steps in preparing the tire for the market. This work has been formerly done by hand and is a tedious operation, but by the use of the machine shown herein the work is done better and more rapidly.

In the drawings accompanying this application there is shown one embodiment of my invention, but it is obvious that changes may be made without departing from the spirit of the invention.

In the drawings,

Fig. 4 is a vertical section transversely of the machine, and

Fig. 5 is a vertical section at right angles to Fig. 4.

Figure 1:
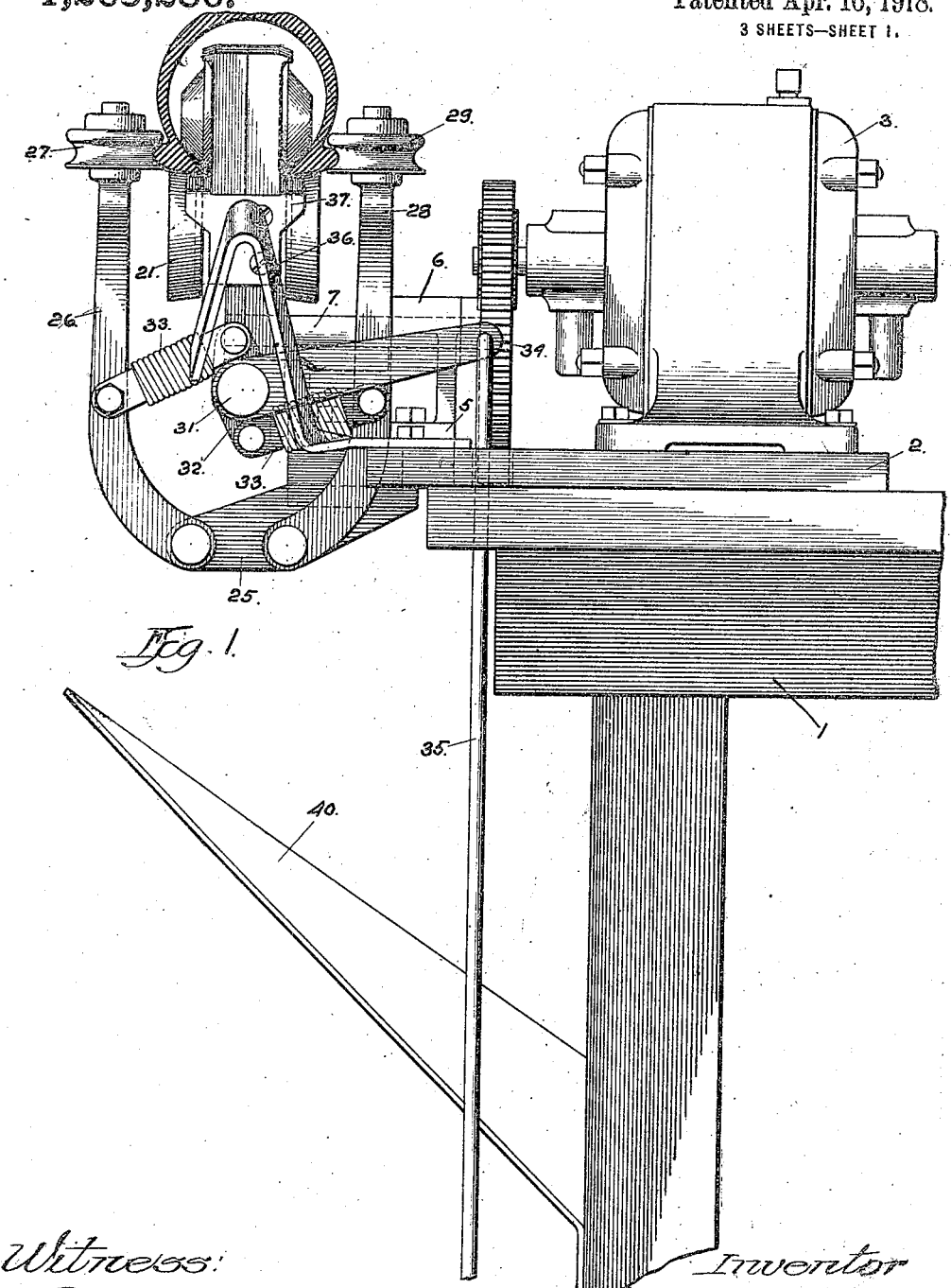
Figure 1 is a side elevation of the machine forming one embodiment of this invention.
Figure 2:
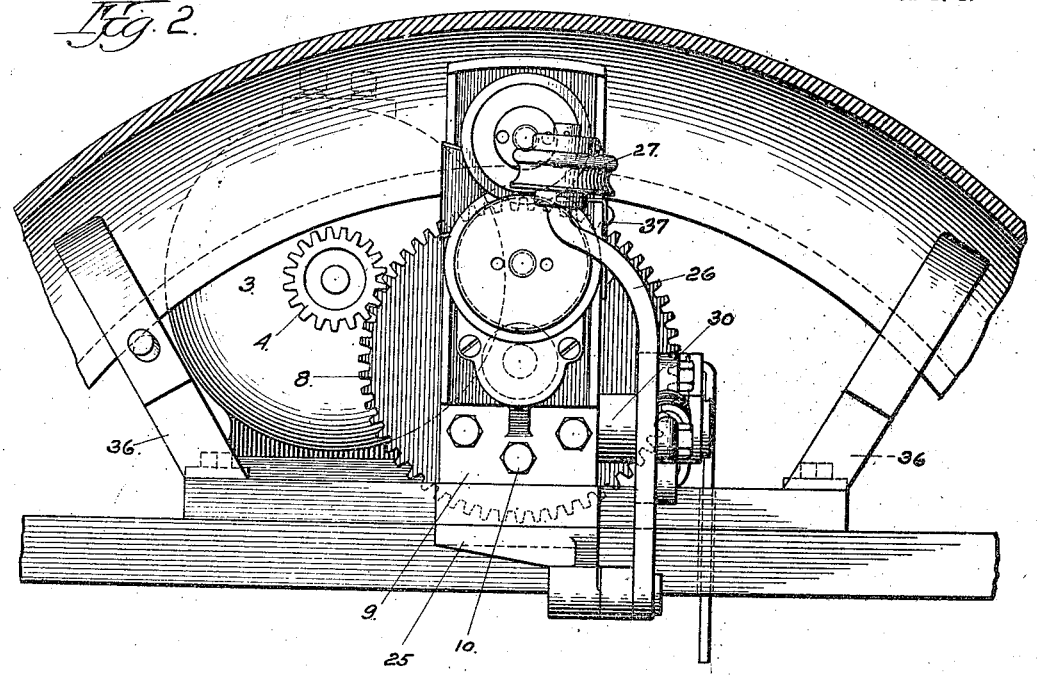
Fig. 2 is a front elevation, one-half of the tire casing being removed.
Figure 3:
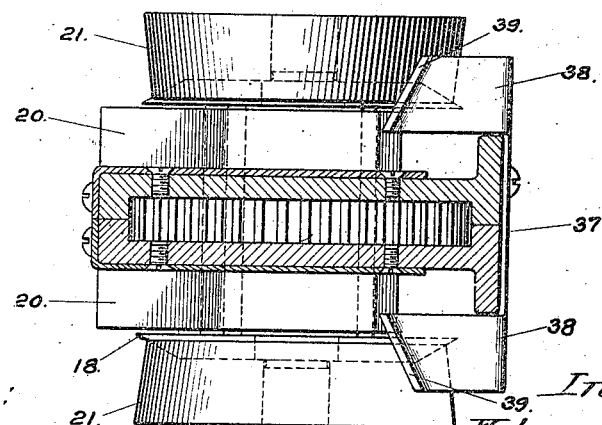
Fig. 3 is a horizontal section through the machine.

The machine is carried on a table or other suitable support 1, near the edge of which is secured a base-plate 2 of the machine, slightly overhanging the edge of the table. On the rear of the base plate is mounted the motor 3, which drives the machine through a pinion 4. On the forward surface of the base plate is secured a bracket 5, the rear end constituting a bearing 6, in which is mounted the main shaft 7 of the machine, driven by a gear 8 in mesh with the pinion 4. A gear case formed of two facing plates forms the housing for the operative parts of the machine. One of the plates 9 is secured by bolts 10 to the front of the bracket 5. The facing plate is designated by the numeral 11, the two plates having bearings for the reception of various shafts and recesses in which the gears will revolve, as will be described. The forward end of the shaft 7 projects through the lower end of the plate 9 and carries a drive pinion 12 in mesh with a larger pinion 13 carried on the lower cutter shaft 14, which is journaled in bearings in the plates 9 and 11. Directly above the shaft 14 is journaled the upper cutter shaft 15 carrying a gear 16 in mesh with the gear 13. The projecting extremities of the shafts 14 and 15 are formed with reduced portions 17 on which are carried circular knives 18, one pair on each side of the gear case. Outwardly of the portions 17 the shafts are screw threaded as at 19 for purposes to be described. In the rear of the overlapping or cutting portion of each pair of knives the gear case is recessed to provide a throat 20, into which the edges of the tire casing may project, the trimmings may be received and through which they are ejected. A cap plate or roller is screwed on each projecting end of the shaft 14, being immovably connected with the circular knife by pins 22. The periphery of the cap plate is tapered inwardly slightly so that the under side of the tire bead may bear thereon, as shown in Fig. 1. The upper knife shaft 15 carries on each outer extremity a cone shaped roller or cap plate 23, being held immovable with respect to the upper knife by pins 24. The plate 23 tapers outwardly so that the pass between the two rollers 21 and 23, of each pair, corresponds to the lower edges of a tire casing.

To the under surface of the overhanging edge of the base plate 2 there is secured a bracket 25, to the extremity of which is pivoted a rocker arm or lever 26, extending upwardly to a point opposite the pass between the cutters, at which point is mounted a roller 27 shaped to correspond with the outer surface of the bead. A second arm 28 is also pivoted to the bracket 25 and extends upwardly parallel to the arm 26 and terminates opposite the pass between the other pair of knives, carrying a roller 29 similar to the roller 27. In the outer extremity of the bracket 5 there is carried a bearing 30, in which is rotatably mounted a rock shaft 31, having two outwardly extending crank portions or ears 32. Spring links 33 pivotally connect the arms 26 and 28 to the central crank 32. A lever 34 is carried by the shaft 31, the outer end carrying a rod 35 which is connected to a foot treadle (not shown). A V-shaped spreader or guide 36 is fastened to each forward corner of the base plate and serves to spread apart and guide the tire casing in the pass between the knives. A shield or guide plate 37 is secured on the incoming side of the gear casing and is provided with two horns or fingers 38 which extend toward the throat of the cutters and terminate in inclined flanges 39, which are directed toward the overlapping edges of the cutters. These guides serve to catch up the straggling edges or frays depending from the edges of the tire casing and direct them into the throat 20 and between the knives.

The operation of the machine may be briefly described as follows:

The operator places the tire which is to be trimmed over the gear casing with the spreaders or guides 36 projecting between the beads. He then depresses the treadle, which action serves to rock the arm 34, forcing the rollers 27 and 29 inwardly against the "heel" of the bead. The inward movement of the rollers serves to force the beads between the rollers 21 and 23. A close driving contact between these face plates or rollers, which are constantly rotated by the motor, and the tire serves to rotate the tire through the pass and the casing is trimmed. A chute or basket 40 is arranged to catch the scrap as it falls from the throat 20 of the machine.

Although I have described the machine in detail, it is obvious that such details are not essentials and that variations may be made without altering the scope of this invention.

Claims:

1. A machine for trimming tire casings, comprising two pairs of trimming knives, means to support the tire casing so that it will surround the knives and driving mechanism to effect travel between the casing and the knives.

2. A machine for trimming tire casings, comprising two pairs of rotary trimming knives located between the beads of the casing, means to support the tire casing and driving mechanism to effect travel between the casing and the knives.

3. In a machine for trimming tire casings, a knife and means for holding and directing the lower edge of a tire casing into said knife, comprising an upper and a lower surface movable with respect to the casing and having a contour similar to the inner and outer surfaces of the casing respectively.

4. In a machine for trimming tire casings, a knife and means for holding and directing the lower edge of a tire casing into said knife, comprising rollers adapted to contact the inner and outer lower surfaces of the casing, the pass between said rollers corresponding to the shape of the lower inner and outer surfaces of the casing, said knife being located at the small end of the pass between said rollers.

5. In a machine for trimming tire casings, a knife and means for holding and directing the lower edge of a tire casing into said knife, comprising rollers adapted to contact the inner and outer lower surfaces of the casing, the pass between said rollers corresponding to the shape of the lower inner and outer surfaces of the casing and a third roller adapted to run on the heel of the bead.

6. In a machine for trimming tire casings, a knife, a roller conforming to the heel of the bead, second and third rollers conforming to the inside and outside lower edges of the casing, means to move one of said rollers to hold said casing in position between the other two said rollers, and means for rotating one of said rollers to advance the tire casing.

7. In a machine for trimming tire casings, a roller conforming to the heel of the bead, second and third rollers conforming to the inside and outside lower edges of the casing, a knife located in the rear of said second and third rollers, and means to move said first named roller to force the edge of said casing between the other rollers and into the path of the knife.

8. In a machine for trimming tire casings, a roller conforming to the heel of the bead, second and third rollers conforming to the inside and outside lower edges of the casing, means for rotating the last two rollers, a knife and means to move said first named roller to force the edge of said casing between the other rollers to advance the casing.

9. In a machine for trimming tire casings, a roller conforming to the heel of the bead, second and third rollers conforming to the inside and outside lower edges of the casing, means for rotating the last two rollers, a rotary knife at the rear of the last two rollers, and means to move said first named roller to force the edge of said casing between the other rollers to advance the casing across the knife.

10. In a machine for trimming annular tire casings, pairs of oppositely faced feeding rollers adapted to conform to the lower edges of a tire casing, knives located interiorly of the casing and adapted to trim the edges of the casing and means to hold the edges of the casing against the rollers.

11. In a machine for trimming tire casings, pairs of oppositely faced feeding rollers adaptel to conform to the lower edges of a tire casing, knives to trim the edges of the casing, a pair of movably mounted rollers adapted to contact the heels of the tire beads, and means to force said rollers against the beads.

12. In a machine for trimming tire casings, pairs of rotary knives mounted between the beads of the casing adapted to trim the lower edges of the casing and a spreader adjacent the knives projecting between the beads of the casing.

13. In a machine for trimming tire casings, pairs of rotary knives adapted to trim the lower edges of the casing, a spreader adjacent the knives and projecting between the beads of the casing and rollers opposite the knives to force the beads against them.

14. In a machine for trimming tire casings, pairs of rotary knives adapted to trim the lower edges of the casing, a spreader adjacent the knives and projecting between the beads of the casing, and sets of rollers opposite the knives adapted to contact the beads on their outer surfaces.

15. In a machine for trimming tire casings, pairs of rotary knives adapted to trim the lower edges of the casing a spreader adjacent the knives projecting between the beads of the casing and sets of rollers opposite the knives adapted to contact the beads and hold them in cutting relation to the knives.

EDWARD D. PUTT.